United States Patent [19]
Irwin, Sr.

[11] Patent Number: 5,612,113
[45] Date of Patent: Mar. 18, 1997

[54] CARPET WITH FLUID BARRIER

[75] Inventor: Donald A. Irwin, Sr., Dalton, Ga.

[73] Assignee: Darwin Enterprises, Inc., Dalton, Ga.

[21] Appl. No.: 639,709

[22] Filed: Apr. 29, 1996

Related U.S. Application Data

[63] Continuation of Ser. No. 349,438, Dec. 5, 1994, abandoned.

[51] Int. Cl.⁶ .................................................. B32B 3/02
[52] U.S. Cl. .................................................. 428/95; 428/97
[58] Field of Search ........................................ 428/95, 97

[56] References Cited

U.S. PATENT DOCUMENTS

| | | | |
|---|---|---|---|
| 3,007,205 | 11/1961 | House | 428/172 |
| 3,839,134 | 10/1974 | Fujihara | 428/95 |
| 3,940,525 | 2/1976 | Ballard | 428/96 |
| 4,324,824 | 4/1982 | Narens et al. | 428/92 |
| 4,579,762 | 4/1986 | Ucci | 428/95 |
| 4,619,853 | 10/1986 | Blyth et al. | 428/95 |
| 4,643,930 | 2/1987 | Ucci | 428/96 |
| 4,647,484 | 3/1987 | Higgins | 428/95 |
| 4,655,784 | 4/1987 | Rahman | 8/148 |
| 4,657,790 | 4/1987 | Wing et al. | 428/95 |
| 4,731,143 | 3/1988 | Cross | 156/231 |
| 4,766,745 | 8/1988 | Johnston et al. | 68/200 |
| 4,828,898 | 5/1989 | Bailey | 428/95 |
| 4,844,765 | 7/1989 | Reith | 428/97 |
| 4,915,999 | 4/1990 | Tillotson | 428/95 |
| 5,104,712 | 4/1992 | Walters | 428/95 |
| 5,230,940 | 7/1993 | Böhm et al. | 428/95 |
| 5,240,530 | 8/1993 | Fink | 156/72 |
| 5,348,785 | 9/1994 | Vinod | 428/95 |

FOREIGN PATENT DOCUMENTS 5711279  6/1980  Japan .

OTHER PUBLICATIONS (WPAT)—FR2694248–A–1 94.02.04.
(WPAT)—JP06007240–A.
(WPAT)—JP06007239–A.
(WPAT)—ES2029412–A6.
(WPAT)—DE3113246A.

*Primary Examiner*—Terrel Morris
*Attorney, Agent, or Firm*—Alan Ruderman

[57] ABSTRACT

A carpet including yarn pile extending from the face of a primary backing and a secondary backing bonded to the back of the primary backing has a thin film of liquid impervious thermoplastic material bonded either to the rear of the primary backing or to the rear of the secondary backing to provide a fluid barrier for preventing spills from seeping through to a floor beneath the carpet. The film is bonded to either backing by a hot melt thermoplastic adhesive or other non-aqueous adhesive. Additionally, the method of providing such fluid barrier for the carpet is disclosed.

5 Claims, 1 Drawing Sheet

CARPET WITH FLUID BARRIER

This application is a continuation of application Ser. no. 08/349,438, filed Dec. 5, 1994 now abandoned.

BACKGROUND OF THE INVENTION

This invention relates to broadloom carpet and more particularly to such carpet having a backing including a barrier impervious to fluid penetration.

Carpet, whether tufted or woven, does not provide a fluid barrier to the under surface upon which the carpet is positioned. The vast majority of manufactured carpet is tufted carpet wherein yarn is stitched into a web of primary backing material. In most cases this primary backing comprises a woven web of polypropylene including ribbon fibers. The majority of carpets are backed with a latex and a secondary backing which may be jute, but substantially more frequently with a woven polypropylene having spun or fibrillated fibers which adhere to latex. An example of a secondary backing of this latter type is sold by AMOCO under the trademark ACTION BAC. Carpets having such secondary backings may be installed on a cushion material and stretched onto a floor for residential use, or may be directly glued onto a floor, the latter being a procedure generally limited to commercial use. Other carpets having such a secondary backing may be directly bonded by latex to a foam material which acts as the cushion for carpet.

When a liquid such as a beverage, milk or the like or urine from a pet, or rain in the case of outdoor carpet, accidentally spills onto the surface of the carpet the liquid flows through the carpet to the back of the carpet and soaks all the way through to the cushion and the floor beneath. Carpet manufacturers universally recommend that the spills be cleaned up promptly, but generally it is highly impracticable to clean and absorb the spills before at least some of the liquid has penetrated through the backing to the sub-floor. This leads to possible permanent odors, stains, formation and entrapment of bacteria, and other potentially carpet destroying characteristics.

Attempts to solve this problem to date have met with limited success. For example, a backing system from DuPont comprising a coating known under the trademark SPILLBLOCK which works to keep spills from soaking through the carpet is stated by the manufacturer not to be completely impervious to the spills and the manufacturer recommends cleaning up the spills promptly. Additionally, closed cell foams or solid polymeric coatings have been utilized in commercial applications. However, such products are very costly and thus have a very limited application. Accordingly, the problem persists and has not been solved completely or economically in the prior art.

SUMMARY OF THE INVENTION

Consequently, it is a primary object of the present invention to provide a fluid barrier for carpets which is substantially completely impervious to liquids.

It is another object of the present invention to provide a carpet to which a thin film of impervious material is bonded to either the primary or secondary backing by an adhesive which itself is insoluble in water and other non-toxic liquids normally spilled onto carpets.

Accordingly, the present invention provides a carpet having a primary backing into which tufted yarn is stitched, the carpet having a secondary backing for securing the tufts in the primary backing or a foam cushion, and a thin film of material which is impervious to spills normally encountered in residential and commercial establishments, such as water and alcohol based beverages, and urine, the film being bonded either to the primary backing or the secondary backing, which may be a foam cushion, by an adhesive which not only provides a bond, but itself is insoluble to such spilled fluids.

Conventional hot melt adhesives, or other non-aqueous adhesives such as polyurethanes which sometimes are used instead of latex to bind a secondary backing to the primary backing for obtaining a stronger bond than latex, may be utilized as the adhesive, or other adhesives which do not contain solvents or water may utilized. The adhesive may act as a precoating agent for the secondary backing as well as the adhesive for lamination of the film wherein the film is laminated to the primary or secondary backing, or the adhesive may be the bonding agent for the film to the secondary backing, which may be a foam cushion.

BRIEF DESCRIPTION OF THE DRAWINGS

The particular features and advantages of the invention as well as other objects will become apparent from the following description taken in connection with the accompanying drawings in which.

DESCRIPTION OF THE PREFERRED EMBODIMENT

Figure 1:
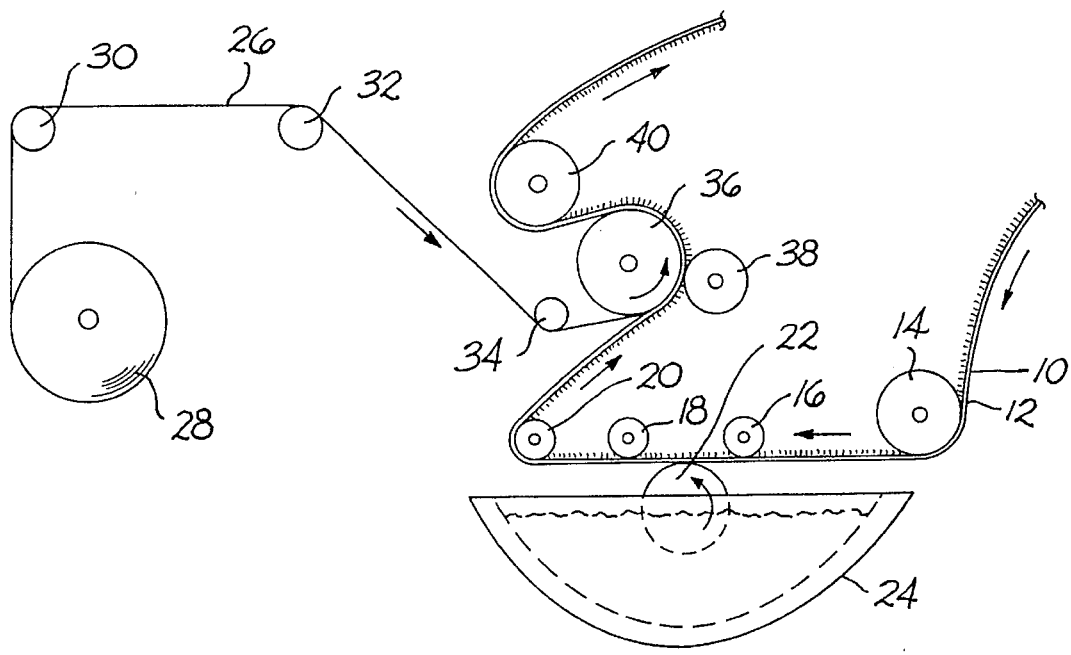
FIG. 1 is a schematic view of one method of bonding a liquid impervious film by a hot melt adhesive to the backing of a carpet.

In accordance with the present invention a film of liquid impervious material is applied to either the primary or secondary backing of carpet to achieve a fluid barrier so that liquids spilled onto the carpet do not penetrate through the carpet onto the sub-surface beneath the carpet. Additionally, in those cases where carpet has a foam backing rather than a conventional secondary backing, it may be applied to the inner surface of the primary backing and the foam is thereafter applied. Materials from which such film may be formed to provide such impervious properties include polyethylene, polypropylene, polyurethane, polyester, polyvinylchloride (PVC), combinations of these and similar thermoplastic materials which may be surface treated and may be composite structures formed from laminates of these fibers with non-woven or woven fibers and either with or without reinforcing fibers. The film may vary in thickness from approximately 1 mil to 5 mils with a thickness in the order of 1.5 mils being preferred, and thus the film is of course flexible.

Conventionally, carpets are tufted into a primary backing, generally comprising polypropylene. A secondary backing is thereafter bonded to the primary backing to lock in the stitches, the secondary backing generally being bonded to the primary backing by latex and the product is thereafter heated in an oven to cure the latex. The secondary backing is a woven material such as polypropylene having a course weave and thus a very open structure for reasons of economics. The latex adhesive is applied as a very thin coating and thus spilled liquids readily penetrate through the backing down to the subsurface beneath. Certain inexpensive carpets may include a foam cushion backing rather than a woven secondary backing, the foam being either latex or a urethane foam which is open cell and thus permits liquids to be absorbed and trapped. In accordance with the present invention, the fluid impervious film may be applied to the rear of the primary backing over the backstitches prior to the application of the secondary backing or may be applied directly to the rear of the secondary backing. In some instances, in order to secure the stitches into the primary backing more securely, a hot melt thermoplastic adhesive such as polyethylene, polyethylene vinyl acetate (EVA), polyamide, polyester or polypropylene is utilized. This is more likely where carpet has loop piles rather than all cut piles since high heels may catch a loop and pull it from the backing where the backing is bonded by latex. Such hot melt adhesives are well known in the art and are excellent vehicles for securing the film to either the primary or secondary backing. Additional adhesives for use in the present invention are other non-aqueous adhesives such as polyurethane, polyvinylchloride, polyvinyl acetate, epoxies and the like.

The adhesive may act as the precoating agent of the carpet for the secondary backing in those instances where the film is applied to the primary backing so that the film may be laminated between the primary and secondary backings. Where the film is to be bonded to the secondary backing, the adhesive acts as the bonding agent for the film to the secondary backing. Where the carpet has a foam cushion rather than a conventional secondary backing, the film may be applied between the primary backing and the foam to prevent spilled liquids from being trapped in the foam.

The film if applied and laminated to the secondary backing, i.e., post lamination, may be carried out in the line at the end of the conventional production process for bonding the secondary backing, or may be applied in a subsequent operation. The backed carpet is thus moved from the latex curing oven to a station where the film is applied and bonded to the outer face of the secondary backing. When hot melt adhesive is used for bonding the film to the backing, the conventional processes for applying hot melt adhesives may be utilized. Such processes include application of the adhesive as an extrusion, as a liquefied spray or as a lick roll rotating within a pan which contains the liquified adhesive.

Figure 2:
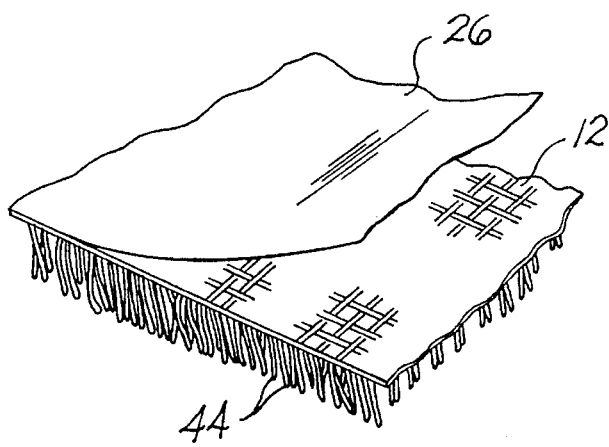
FIG. 2 is a perspective view of a film applied to the secondary backing of a carpet.
Figure 3:
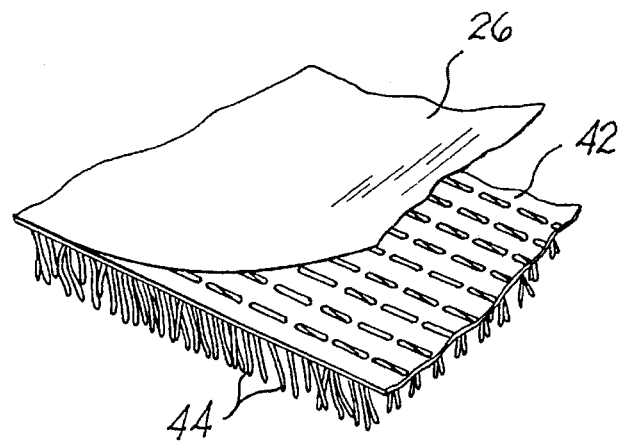
FIG. 3 is a perspective view of a film applied to the primary backing of a carpet.

Preferably, in the latter instance, as illustrated in FIG. 1, a carpet 10 having a secondary backing 12 may be guided by a series of guide rolls 14, 16, 18, 20 over a lick roll 22 rotatably mounted within a pan 24 of hot melt adhesive, a heater (not illustrated) being located for maintaining the adhesive in the liquid state. The exterior surface of the secondary backing 12 is contacted by the lick roll and receives a coating of the adhesive. Film of fluid barrier material 26, being flexible is mounted on a roll 28 and is fed over guide rolls 30, 32, 34 and both the film and the carpet, as shown in FIG. 2, are fed through the nip between a pair of pressure or contact rolls 36, 38 which force the film 26 against the adhesive on the secondary backing. The carpet with film adhering thereto may then be guided by a guide roll 40 as it cools and solidifies and subsequently wound into a roll of finished product. As illustrated in FIG. 3, the film 26 may be applied and bonded to the back of a primary backing 42 through which strands or tufts 44 of yarn have been stitched prior to the secondary backing being applied. In this case, the hot melt glue is applied to the primary backing as the pre-coating agent for the secondary backing as well as the adhesive for lamination of the film. The secondary backing thereafter may be applied over the film and may be bonded thereto by the hot melt adhesive.

Alternatively, the adhesive may be applied to the film which is then pressed against the primary or secondary backing. In that case the adhesive preferably is sprayed onto the film.

For achieving the fluid barrier on conventional residential carpet, an unsupported film bonded to the secondary backing is sufficient to provide the fluid barrier since residential carpet is normally laid over a cushion, stretched and attached to the floor by tacks or tackless mounting strips, i.e., residential carpet is not glued to the floor. In commercial use, where the carpet may be glued directly to the floor, a film having a fiberous surface on the side facing the floor may be preferred. This permits the use of conventional carpet-to-floor adhesives. The laminated film may also have an additional layer of polyester fiber or glass fiber to increase the dimensional stability of the carpet.

The fluid barrier may be applied to the carpet with non-aqueous adhesives other than hot melt adhesives. Such adhesives should not contain solvents or water which would require additional processing and difficulties. Polyurethane is one such conventional adhesive known in the bonding art. Others are polyvinylchloride, polyvinyl acetate, epoxies and the like. Such adhesives may be coated conventionally onto the back of the secondary backing of carpet or directly to the film and cured with or without heat, dependent upon the particular composition of the adhesive. Thus, the process is similar to that used for the hot melt adhesives but utilizes appropriate adhesive mixing equipment and processing well known in the art. These adhesives may also be applied to the primary backing to act as a pre-coat for the secondary backing and as an adhesive for the film. Where a foam cushion is to be applied to the carpet rather than a conventional woven secondary backing, the fluid barrier is applied between the primary backing and the foam and bonded therebetween. In most instances of this type, it is preferable to use a film that comprises a non-woven or woven fabric on both sides to gain a maximum bond. However, corona treatment on one side of the film may be sufficient to be bondable to the backing. It is preferred that when a pre-coat and a foam is to be applied to the primary backing, the film is to be layered onto the surface of the pre-coated carpet in the production line prior to the application of the foam.

Accordingly, the present invention provides a film of material which forms a fluid barrier as a laminate between the primary and secondary backing of carpet or as an outer layer on the secondary backing of the carpet so as to preclude liquids which have been spilled onto the surface of the carpet from soaking or permeating through the carpet substrate to the under surface beneath the carpet. The present invention accordingly provides a solution to a problem which has plagued the carpet industry since time immemorial.

Numerous alterations of the structure herein disclosed will suggest themselves to those skilled in the art. However, it is to be understood that the present disclosure relates to the preferred embodiment of the invention which is for purposes of illustration only and not to be construed as a limitation of the invention. All such modifications which do not depart from the spirit of the invention are intended to be included within the scope of the appended claims.

Having thus set forth the nature of the invention, what is claimed herein is:

1. A carpet for covering a floor having a primary backing material including a face surface and a back surface, a plurality of yarn strands extending from said face surface and a plurality of back stitches disposes on said back surface, a secondary backing having a first surface and a second surface bonded over said back surface with said first surface facing said backstitches, and a flexible film having a thickness in the range of approximately 1 to 5 mils comprising liquid impervious thermoplastic material bonded by a non-aqueous thermoplastic adhesive to said second surface to form an exterior surface of said carpet and provide a fluid barrier precluding liquids accidentally spilled onto said face surface from penetrating through to a floor beneath the carpet.

2. A carpet as recited in claim 1, wherein said thermoplastic film is selected from the group consisting of polyethylene, polypropylene, polyurethane, polyester and polyvinylchloride.

3. A carpet as recited in claim 1, wherein said secondary backing comprises a web of woven material.

4. A carpet as recited in claim 1, wherein said secondary backing comprises a foam cushion.

5. A carpet for covering a floor having a primary backing material including a face surface and a back surface, a plurality of yarn strands extending from said face surface and a plurality of back stitches disposed on said back surface, a secondary backing having a first surface and a second surface bonded over said back surface with said first surface facing said backstitches, and a flexible film having a thickness in the range of approximately 1 to 5 mils comprising liquid impervious thermoplastic material bonded by a non-aqueous adhesive selected from the group consisting of polyurethane, polyvinylchloride, polyvinyl acetate and epoxies to said second surface to form an exterior surface of said carpet and provide a fluid barrier precluding liquids accidentally spilled onto said face surface from penetrating through to a floor beneath the carpet.

* * * * *